United States Patent [19]

O'Connor

[11] Patent Number: 5,140,764
[45] Date of Patent: Aug. 25, 1992

[54] NON-BLOCKING MICROFILM JACKET

[75] Inventor: Mark O'Connor, Jamaica, N.Y.

[73] Assignee: NB Jackets de Puerto Rico, Caguas, P.R.

[21] Appl. No.: 724,109

[22] Filed: Apr. 17, 1985

[51] Int. Cl.⁵ .............................................. A47G 1/06
[52] U.S. Cl. ..................................... 40/159; 428/191; 428/332
[58] Field of Search ................ 40/159; 209/608; 428/332, 191; 156/243

[56] References Cited

U.S. PATENT DOCUMENTS

| | | | |
|---|---|---|---|
| 3,238,655 | 3/1966 | Engelstein | 40/159 |
| 3,540,959 | 11/1970 | Conner | 428/141 |
| 3,713,535 | 1/1973 | Engelstein et al. | 209/608 |
| 3,818,027 | 4/1974 | Anderson et al. | 428/332 |
| 4,293,606 | 10/1981 | Zollinger et al. | 428/332 |
| 4,411,945 | 10/1983 | Akad et al. | 428/141 |
| 4,452,666 | 6/1984 | Dorman | 156/243 |
| 4,477,502 | 10/1984 | O'Sullivan | 428/332 |
| 4,518,643 | 5/1985 | Francis | 428/332 |

FOREIGN PATENT DOCUMENTS 1223855 9/1966 Fed. Rep. of Germany ...... 209/608

Primary Examiner—Kenneth J. Dorner
Assistant Examiner—Brian K. Green
Attorney, Agent, or Firm—Michael Ebert

[57] ABSTRACT

A multi-channel transparent jacket for accommodating strips of microfilm to create a microfiche, the jacket having non-blocking characteristics, thereby minimizing the tendency of one jacket in a stack thereof to stick to an adjacent jacket. The jacket is constituted by front and rear panels formed of flexible polyethylene terephthalate film joined together by a parallel array of ribs to define the channels. The exposed surfaces of the panels have a friction-reducing layer thereon constituted by a multiplicity of discrete silicon dioxide nodules bonded to the film, the nodule shape approximating a surface segment of a sphere. The peaks of the segments form microscopic contact points which are bonded by molecular attraction to an abutting panel when the jacket is juxtaposed against a like jacket in frictional relationship thereto. The nodules have a relatively large average diameter whereby the population density thereof in a unit area of the layer produces multiple contact points resulting in a coefficient of friction whose value imparts non-blocking characteristics to the jacket to a degree permitting tangential displacement thereof with a like jacket sticking thereto.

5 Claims, 1 Drawing Sheet

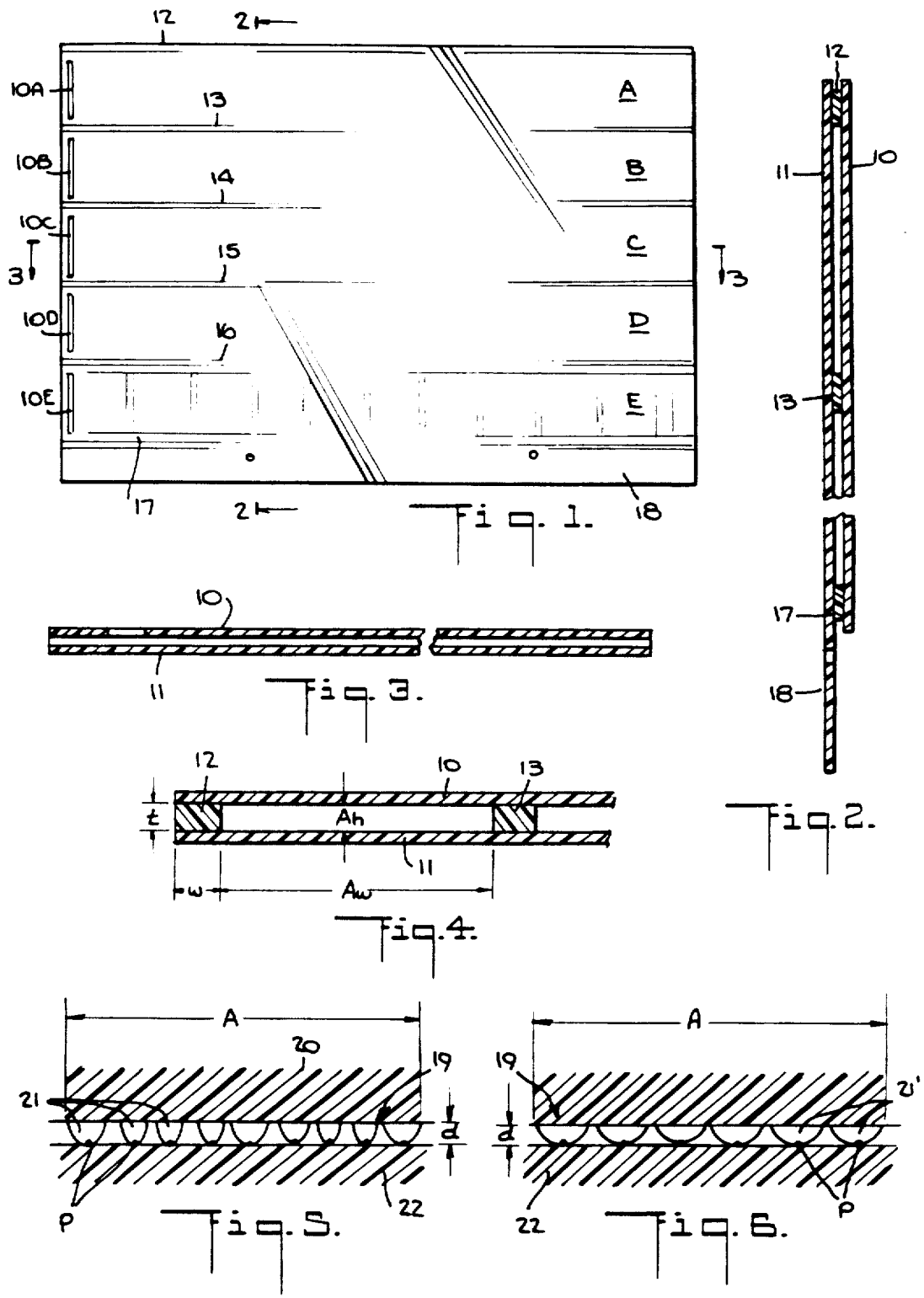

NON-BLOCKING MICROFILM JACKET

BACKGROUND OF INVENTION

1. Field of Invention

This invention relates generally to a multi-channel transparent jacket for accommodating strips of microfilm, the jacket being constituted by front and rear panels of flexible plastic film material joined together by a parallel array of ribs which define the channels, and more particularly to a jacket of this type in which the panels are formed of polyethylene terephthalate film having a friction-reducing surface layer thereon imparting non-blocking characteristics to the jacket, whereby when such jackets are stacked they do not stick to each other, and it is possible, therefore, to extract one jacket from the stack without an adjacent jacket being carried along by this action.

2. Status of the Art

The Engelstein U.S. Pat. No. 3,238,655 entitled "Microfiche Master" discloses a transparent jacket formed by two plastic panels laminated together by a parallel array of ribs which define a series of chambers or channels adapted to accommodate micro film strips. The loaded, multi-channel jacket functions as a microfiche master from which reference copies may be made. This is effected by contact-printing through the front panel which is quite thin and has good optical properties, the back panel being thicker to impart body to the jacket. Such microfiche masters are highly useful in storing and disseminating information.

The Dorman U.S. Pat. No. 4,452,666 shows a similar multi-channel transparent jacket, but in this instance, the ribs are formed by extruding molten beads of plastic material and directing these beads between the panels which are then compressed to produce in situ ribs integral with the panels. The present invention is applicable to any transparent jacket formed by front and rear panels of polyethylene terephthalate film material. It is also applicable to file cards and other record sheets made of polyethylene terephthalate film or similar polymeric material.

The Engelstein-Dorman U.S. Pat. No. 3,713,535 discloses a random access system in which microfilm jackets of the type disclosed in the above-identified Engelstein and Dorman patents are stacked in a file cartridge, a picker mechanism being provided which is adapted to select and extract any jacket from the cartridge regardless of its location therein. But because the jackets in the cartridge tend to stick together, in removing one jacket, the adjacent non-selected jackets may also be withdrawn. To overcome this drawback, the picker mechanism is vibrated in order to dislodge the unwanted jackets.

Commercially available transparent multi-channel jackets of the above-identified type are provided with an upper extension margin having a translucent coating on which one may print a title or other information relevant to the microfilm data contained in the jacket. It is now possible, using computer-controlled printers, to feed these jackets into a printer for titling, the jackets being taken one at a time from a stack. However, should an automatic feeder mechanism be used, the same difficulty is experienced in this automatic feeding action as in the random access system previously mentioned; for when the feeder mechanism removes a jacket from the top of the stack, the underlying jacket will at the same time be withdrawn should it stick to the top jacket.

In a computer-operated printer, the computer is programmed to instruct the printer to title the jackets successively fed thereto in a manner appropriate to each jacket. Should two or three jackets be fed at one time into the printer, this will upset the feed sequence and result in mistitling of the jackets. And since existing jackets tend to stick together, the only way one can properly feed such jackets into a printer for titling is by hand, one at a time.

The need exists, therefore, for a transparent multi-channel jacket that does not block, this being the term used in the trade to describe a situation in which the jackets in a stack tend to stick together and therefore block.

The present invention is concerned only with jackets whose panels are formed of polymeric material such as polyethylene terephthalate film (Mylar). While jackets of this material tend to stick together or block, this adhesion is not due to any tacky or sticky quality of the film. Mylar film is very smooth and devoid of any natural stickiness in the sense of it being viscous or gluey. The apparent stickiness is a consequence of the film's coefficient of static friction, and it is therefore necessary to review briefly the nature of friction so that this phenomenon and its relevance to the present invention are fully understood.

As applied to a solid body in rubbing contact with another, the term "friction" refers to the resistance to movement which is encountered when one seeks by way of an applied shear force to tangentially displace the solid body. On the atomic scale, even the most highly polished surface is far from perfectly planar. Thus when two finely polished metal plates are placed into intimate contact with each other, the actual microscopic area of contact is formed by a myriad of contact points and is much less than the apparent macroscopic area of contact.

Actual contact points tend to cold weld together, this bonding action taking place because at each minute contact point, the molecules on opposite sides thereof are so close together that they exert a strong intermolecular force on each other. When, therefore, one body is pulled across another, the frictional resistance therebetween can only be overcome by rupturing thousand of minute cold welds.

The coefficient of friction (u) is defined as the ratio of the force of friction ($f_r$) to the normal force (N), the latter being the force pressing the rubbing surfaces together. Thus should the shear force necessary to overcome friction to effect tangential movement of the body be greater than the normal force, the coefficient of friction will then exceed 1 in value, but if it is less than the normal force, it will have a decimal value, such as 0.6 or 0.45.

Friction is invariably significantly greater at the start of motion than it is once motion has commenced. Hence one must distinguish between the coefficient of static friction ($u_s$), which is a measure of the limiting friction which prevails just before motion starts, and the coefficient of kinetic friction ($u_k$), which is a smaller coefficient that applies to the condition which prevails when uniform motion is in progress. In order to determine the coefficient of static friction, a block is placed on an inclined plane, and the plane is then gradually tilted until an angle is reached at which the block just slides down. The tangent of the angle of inclination is equal to the coefficient of friction between the block and the plane.

A number of processes occur at the interface of two solids which tend to inhibit sliding motion and therefore contribute to friction. In the history of technology, the question of which one of these processes is mainly responsible for friction has been the subject of extensive study. Until about 1940, it was thought that the main source of friction was surface roughness in that work had to be done during sliding motion to lift one surface over the high spots of the other surface in rubbing contact therewith.

More recently, the importance of surface roughness has been discounted, first because the work done in sliding up a high spot on the surface is in good measure recovered on the down slide. Indeed, experimental testing has demonstrated that for most sliding systems, the coefficients of friction are largely independent of surface roughness.

Thus a surface which is extremely smooth to the touch, such as cleaved mica, which is smooth to within one atomic diameter, nevertheless gives rise to friction which is as great or greater than that experienced with ordinary surfaces. By the same token, a Mylar film which has an extremely smooth surface has a high coefficient of friction.

The modern theory of friction attributes friction primarily to intermolecular bonds at the microscopic points of actual contact between two solids which are in rubbing relationship. Friction therefore mainly represents the force required to break these intermolecular bonds. For a more detailed analysis of the modern theory of friction, reference is made to the section on friction (page 405 et seq.) in the 1983 McGraw-Hill Encyclopedia of Engineering, edited by S. P. Parker.

In order to enhance the slip characteristics of polymeric film so that when the film is wound on a roll, the layers thereof have sufficient slip to permit proper coiling, it is known to coat the surface of the film with segregated nodules of silicon dioxide.

Thus in the 1974 patent to Anderson et al. U.S. Pat. No. 3,808,027, whose entire disclosure is incorporated herein by reference, the slip characteristics of the film are improved by first bringing the film surface in contact with water vapor to render it polar. The polar surface is then brought into contact with a hydrolyzing tetrafunctional silicon compound for a brief period of time sufficient to form discrete nodules of silicon dioxide which are bonded onto the film surface. These minute nodules bring about no appreciable change in the clarity or other optical properties of the transparent film.

A Mylar film treated in the manner disclosed in the Anderson et al. patent has improved slip to an extent which facilitates winding and other film handling operations. However, this treatment does not impart to the film a sufficiently reduced coefficient of static friction to prevent or minimize blocking when the treated film forms the panels of a transparent multi-channel jacket. Because jackets whose panels are made from such treated film tend to stick together, it becomes necessary, when the jackets are stacked, to employ special expedients to dislodge unwanted jackets when extracting a desired jacket from the stack.

SUMMARY OF INVENTION

In view of the foregoing, the main object of this invention is to provide a multi-channel transparent jacket for accommodating strips of microfilm, the panels of the jacket being formed of polymeric film material whose exposed surfaces have a friction-reducing layer thereon which impart to the jacket a coefficient of static friction whose value is such that the jacket has non-blocking characteristics.

A significant advantage of the invention is that it now becomes possible to use an automatic picker mechanism to select and extract a particular jacket from a stack thereof without at the same time removing non-selected jackets. The invention also makes it possible for the first time to use automatic feeder mechanisms to pull jackets one at a time from a stack thereof and to convey the jackets sequentially into a printer or other jacket processor without encountering the problem of sticking or blocking.

More particularly, it is an object of this invention to provide a jacket of the above type whose panels are formed of polyethylene terephthalate film having a surface layer thereon which imparts thereto a coefficient of static friction that is less than 0.26, at which value the jacket is effectively non-blocking.

Briefly stated, these objects are attained in a multi-channel transparent jacket for accommodating strips of microfilm to create a microfiche, the jacket having non-blocking characteristics, thereby minimizing the tendency of one jacket in a stack thereto to stick to an adjacent jacket. The jacket is constituted by front and rear panels formed of flexible polyethylene terephthalate film joined together by a parallel array of ribs to define the channels. The exposed surfaces of the panels have a friction-reducing layer thereon constituted by a multiplicity of discrete silicon dioxide nodules bonded to the film, the nodule shape approximating a surface segment of a sphere. The peaks of the segments form microscopic contact points which are bonded by molecular attraction to an abutting panel when the jacket is juxtaposed against a like jacket in frictional relationship thereto. The nodules have a relatively large average diameter whereby the population density thereof in a unit area of the layer produces multiple contact points resulting in a coefficient of friction whose value imparts non-blocking characteristics to the jacket to a degree permitting tangential displacement thereof without a like jacket sticking thereto.

OUTLINE OF THE DRAWINGS

For a better understanding of the invention as well as other objects and further features thereof, reference is made to the following detailed description to be read in conjunction with the accompanying drawings, wherein:

FIG. 1 is a plan view of a multi-channel jacket in accordance with the invention;

FIG. 2 is a transverse section taken in the plane indicated by line 2—2 in FIG. 1;

FIG. 3 is a longitudinal section taken in the plane indicated by line 3—3 in FIG. 1;

FIG. 4 is a detail of the jacket;

FIG. 5 schematically illustrates the friction-reducing layer in a treated film;

FIG. 6 schematically illustrates a treated film layer in accordance with the invention.

DESCRIPTION OF THE INVENTION

The Jacket Structure

Referring to FIGS. 1, 2 and 3, showing a microfiche master in accordance with the invention, the master is constituted by a transparent multiple-chamber jacket having parallel channels or chambers A, B, C, D and E. Contained in section E is a microfilm strip or chip, the strip or chip having been inserted by means of a suitable reader-filler machine.

The microfilm strips need not be inserted one at a time, and in practice, additional strips may be added to supplement an existing record. For example, if each chamber has a capacity of ten film frames, then if the first inserted strip is four frames long, there is still room for six more frames. It is important, however, that the second film chip or strip not override the first, for then the microfiche would not be usable. Hence, one reason why it is vital that strips be snugly contained in the channels is in order to prevent a later-inserted film strip from riding over a previously-inserted strip.

The jacket is comprised of two transparent rectangular panels 10 and 11 in superposed relation, the panels being formed of clear, flexible plastic material, preferably a polyester or Mylar film. Polyester material is advantageous because of its exceptional clarity, high strength and dimensional stability.

Interposed between the top and back panels and integral therewith is an array of longitudinally-extending in situ ribs 12, 13, 14, 15, 16 and 17. These ribs are made of the same or of a similar material as the panels and lie in parallel relation to define chambers A to E which are open at either end. In practice, the in situ ribs may be formed of polyvinyl chloride, polyethylene or other suitable synthetic plastic material. The chambers are of like width to accommodate microfilm strips of a given size, such as 16 mm film. The method for making this jacket is disclosed in the above-identified Dorman patent.

The back panel 10 is somewhat wider than top panel 11 to provide a marginal extension which is coated with a translucent coating 18 for titling the microfiche master. This title will be reproduced in contact-printing because of the translucence of the coating.

To facilitate insertion of microfilm strips or chips, a series of generally rectangular slots 10A to 10E are cut across back panel 10 adjacent the front end of the chamber openings. Top panel 11 is preferably exceptionally thin (i.e., about one mil or less) to facilitate contact-printing, whereas back panel 10 is preferably of heavier gauge transparent material (i.e., 3 to 6 mils) to give body to the microfiche.

The ribs are of substantially the same thickness as the inserted microfilm strips, or slightly thinner, so that the sensitive duplicating film is virtually in contact with the microfilm inserts when contact-printing takes place.

Referring now to FIG. 4, we shall now consider the parameters involved in establishing within the jacket formed by panels 10 and 11, a channel A whose width $A_w$ is slightly wider than the width of the microfilm strip to be inserted therebetween, and whose height $A_h$ is substantially the same as the thickness of the strip. The channel width $A_w$ is determined by the distance between ribs 12 and 13, whereas the channel height is determined by the thickness of the ribs.

The microfilm jacket may also be of the type disclosed in the above-identified Engelstein patent which uses pre-formed ribs made by adhesively-coated paper or plastic ribbons. These ribbons supplied to a jacket-producing machine in which the ribbons are fed in parallel relation between upper and lower webs of panel material, the ribbons being interposed between the webs and attached thereto to form a combined web. This is then sliced into individual jackets.

The Panel Surfaces

In order to reduce the coefficient of static friction of the exposed Mylar panel surfaces of the jacket shown in FIGS. 1 to 4 to an extent imparting to the jacket non-blocking characteristics, the films from which the panels are made are so treated that surface layers are formed thereon of discrete nodules of silicon dioxide. The shape, size and distribution of these nodules are such that the actual microscopic area of contact formed by multiple contact points on the surface layer with an abutting surface in rubbing relationship thereto is far less than the apparent macroscopic area of contact to an extent resulting in a coefficient of static friction which has a value which imparts non-blocking characteristics thereto.

Thus should the coefficient of static friction of the Mylar panel have a value of, say, 0.44, the slip of the panels would be improved, yet the jackets formed from the panels would not have non-blocking characteristics. But if the coefficient of static friction is less than 0.26, the jacket will not block.

In order to explain the distinction between a surface layer which has good slip yet blocks, and a slippery layer which has the required non-blocking characteristics, we shall refer to FIGS. 5 and 6. Both Figures show in greatly magnified and idealized form the exposed surface 19 of a Mylar film 20 having bonded thereto a microscopically thin layer formed by discrete nodules (21 and 21', respectively) of silicon dioxide. These layers, in both instances, have a microscopic thickness or height which is such as not to appreciably impair the optical properties of the transparent film. Thus, jackets made from the film can be contact printed or used in a projection type optical reader to display the film stored therein.

In both FIGS. 5 and 6, the nodules have a shape approximating a surface segment of a sphere, and they have a minimum thickness measured from the base to the peak P of the segment equal to thickness d. Hence, the layers in FIGS. 5 and 6 have essentially the same thickness. The nodules 21 in FIG. 5 vary widely in diameter, most of the nodules having a more or less small diameter. The nodules 21' in FIG. 6 all have substantially the same diameter which is relatively large.

The peaks P of the nodules engage an abutting surface 22 and are in rubbing contact therewith. Hence the actual microscopic contact area constituted by the multitude of contact points P in a unit area represented in FIGS. 5 and 6 by A on film 20 in contact with an abutting surface depends on the actual number of contact points within this area. The actual microscopic area of contact is, therefore, much less than the apparent macroscopic area of contact represented by area A, which in unit terms may be one square inch.

It is the intermolecular bonding force or cold welds between contact points P and the abutting surface which determine the coefficient of static friction, for these cold welds must be ruptured when a shear force is applied to move the film tangentially relative to the abutting surface. Hence, the greater the number of contact points P which exist in a unit area A, the higher is the coefficient of static friction. This is why in the case of cleaved mica the coefficient of friction is so high.

One can therefore reduce the coefficient of static friction by substantially reducing the population density of contact points within unit area A on the film layer without, however, increasing the thickness of the layer, for an unduly thick layer would impair the optical properties of the film.

To effect such reduction in the coefficient, the layer, as shown in FIG. 6, is composed of nodules 19' which are about the same shape as nodules 19 and have the same peak height, the difference being that the average diameter of nodules 19' is substantially greater than the average diameter of nodules 19 in FIG. 5.

Hence the population density of nodules 19' within unit area A is necessary smaller than that obtained with nodules 19, so that there are within this area far fewer actual points of contact P. The population density must, of course, be such that the discrete nodules are close together and contact with an abutting surface is made mainly by nodules and not by the underlying film which has a much higher coefficient of friction. In this way, by providing a layer formed of relatively large diameter nodules, the coefficient of friction is substantially reduced and the jacket thereby acquires non-blocking characteristics.

One can improve the slip properties of polymeric material by coating the surface thereof with a continuous film of silicon dioxide. However, as pointed out in the Anderson et al. patent, a continuous $SiO_2$ layer on a flexible polyester film tends to craze when the film if flexed and to impair the optical properties of the film. In order, therefore, to improve the slip without impairing the optical properties, Anderson et al. form a layer constituted by a multiplicity of segregated nodules of silicon dioxide, preferably amorphous silica.

To accomplish this result, the surface of the polymeric film is rendered polar by bringing it in contact with water vapor, the polar surface then being brought into contact with a hydrolyzable tetrafunctional silicon compound such as silicon tetrachloride, tetramethylortho silicate, tetraethylortho silicate and mixtures thereof for a time sufficient to form discrete nodules of silicon dioxide on the film surface. In the Anderson et al. technique, the size of the individual nodules which have a circular configuration varies over a wide range, the diameter generally being about 100 to 5,000 Angstrons (one billionth of a meter).

In one of the examples (Example 1) given in the Anderson et al. patent to illustrate the manner in which discrete nodules of silica are bonded to the surface of an unoriented MYLAR film, the film is maintained at a temperature of about 23° C. and exposed to moist air at about 50° C. for 0.2 seconds to render the surface polar.

Immediately thereafter, the humidified film is exposed to an atmosphere of dry compressed air containing $7.5 \times 10^{-4}$ moles per liter of $SiCl_4$ and maintained at a temperature of 50° C. for a period of about 0.2 seconds, thereby producing a multiplicity of discrete silicon dioxide nodules bonded to the film surface. The nodules so produced are shaped like spherical segments which range widely in diameter and have an average distributed silicon dioxide thickness of 36 Angstron units.

The coefficient of static friction of film made by the technique in Example 1 is given as 0.44. In Example 1, after being treated, the film is subsequently stretched to effect biaxial orientation thereof, whereas in Example II, the film which is treated in the same manner as in Example I is biaxially oriented before treatment, and this results in a higher coefficient of static friction of 0.6.

We have found that transparent microfilm jackets made with Mylar panels treated in accordance with Examples I and II exhibit distinct blocking characteristics, for the coefficient of static friction, while low enough to provide good slip for winding, is too high to avoid blocking.

While the diameters of some of the nodules made in Example 1 by the Anderson et al. technique are relatively large, many of them are quite small, for the nodules fall within a broad range of diameters (100–4,200 Angstrons). As a consequence, the number of contact points P in a given film area is high, as is the resultant coefficient of friction.

In order to obtain a layer of discrete nodules bonded to the film surface which are for the most part of substantially uniform and relatively large diameter as in FIG. 6, with a minimum number of small nodules, one must so adjust the variables in the nodule-forming process to attain the desired results. As pointed out by Anderson et al., the speed of nodule formation, the nodule size and the population density will increase with greater quantities of water on the surface of the film. Other variables are the temperature of the film and the exposure time to the water vapor and layer to the gaseous tetrafunctional silicon compound.

In the present invention, the desideratum is a layer of discrete silicon nodules bonded to the film surface having a height below that which would impair the optical properties of the film, the nodules being of substantially uniform and relatively large diameter. In this way, the number of contact points in a given film area is reduced and the coefficient of static friction has a value which is less than 0.40, such as 0.25 or 0.24, imparting non-blocking characteristics to the jacket. To accomplish this result, the variables in the nodule-forming process are manipulated empirically to obtain a layer having the desired physical properties. These properties can be seen and checked using X-ray fluorescence techniques, electron microscopes or other known measuring instruments.

While there has been shown and described a preferred embodiment of a non-blocking microfilm jacket in accordance with the invention, it will be appreciated that many changes and modifications may be made therein without, however, departing from the essential spirit thereof.

At the very least, a jacket in accordance with the invention which has front and rear panels must have a friction-reducing nodule layer: on the exposed surface of the rear panel which is thicker than the front panel and serves as the backing of the jacket. However, a further reduction in the coefficient of static friction is obtainable if the exposed surface on the front panel is also treated; for when the panels are stacked, the exposed surface of the thin front panel of one jacket is then in abutting contact with the exposed surface of the rear panel of the jacket; and since both of these surfaces are treated there is a high degree of slip therebetween.

The invention is not limited to microfilm jackets of the type described herein, for it is also applicable to jackets in which the channels are defined by lines of ultrasonic seaming which join the panels together. It is also important to bear in mind that the treatment resulting in nodules are bonded to the Mylar film has a permanent effect on the coefficient of static friction and is not transitory or intermittent.

A particular advantage of the invention is that it makes it possible to use automatic feeder mechanisms to supply the non-blocking jackets sequentially from a stack into a computer-controlled printer for titling without the danger that the feeder will pick up more than one jacket at a time from this stack. The present practice which is designed to overcome the tendency of conventional jackets to stick together is to mount the jackets in a train along a continuous web by a tipping action which lightly holds the jackets thereon, the web being fed into the printer. This is a time-consuming and costly procedure.

I claim:

1. A non-blocking multi-channel transparent jacket whose channels are adapted to accommodate microfilm strips, said jacket comprising:
   A a front and rear panels formed of flexible transparent polyethylene terephthalate film having predetermined optical properties and dimensional stability;
   B a parallel array of ribs interposed between said panels and joined thereto to define said channels; and
   C a microscopically thin friction-reducing layer on at least the exposed surface of the rear panel, said layer being formed of discrete nodules of silicon dioxide bonded to the entire film surface, said layer having a height which is less than the value at which said optical properties are substantially impaired, the nodules being of substantially uniform diameter and having a shape approximating that of a surface segment of a sphere, the peaks of the nodules constituting microscopic contact points which are bonded by intermolecular attraction to an abutting panel when the jacket is juxtaposed against a like jacket in frictional relationship thereto, the nodules having a relatively large average diameter whereby the population density of the nodules in a unit area of the layer produces relatively few multiple contact points which result in a low coefficient of static friction whose value is less than 0.26 and thereby imparts non-blocking characteristics to the jacket to a degree permitting tangential displacement thereof without the like jacket sticking thereto, whereby when a plurality of like jackets are in stacked relation in a file, one may pick out and withdraw one of these jackets without at the same time withdrawing any other jacket.

2. A jacket as set forth in claim 1, wherein said nodules are formed of amorphous silica.

3. A jacket as set forth in claim 1, wherein said coefficient of static friction is about 0.25.

4. A jacket as set forth in claim 1, wherein said ribs are preformed and are adhesively bonded to the panels.

5. A jacket as set forth in claim 1, wherein said ribs are in situ ribs formed of polymeric material integrally bonded to said panels.

* * * * *